(12) United States Patent
Li et al.

(10) Patent No.: US 12,592,865 B2
(45) Date of Patent: Mar. 31, 2026

(54) OAM MESSAGE TRANSMISSION METHOD AND APPARATUS, RELATED DEVICE AND STORAGE MEDIUM

(71) Applicants: China Mobile Communication Co., Ltd Research Institute, Beijing (CN); China Mobile Communications Group Co., Ltd., Beijing (CN)

(72) Inventors: Han Li, Beijing (CN); Liuyan Han, Beijing (CN); Weiqiang Cheng, Beijing (CN); Dechao Zhang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 446 days.

(21) Appl. No.: 18/008,718

(22) PCT Filed: Jun. 8, 2021

(86) PCT No.: PCT/CN2021/098876
§ 371 (c)(1),
(2) Date: Dec. 7, 2022

(87) PCT Pub. No.: WO2021/249386
PCT Pub. Date: Dec. 16, 2021

(65) Prior Publication Data
US 2023/0344599 A1 Oct. 26, 2023

(30) Foreign Application Priority Data
Jun. 8, 2020 (CN) .......................... 202010514215.0

(51) Int. Cl.
*H04L 41/34* (2022.01)
*H04L 5/00* (2006.01)

(52) U.S. Cl.
CPC ........... *H04L 41/34* (2022.05); *H04L 5/0044* (2013.01); *H04L 5/0053* (2013.01); *H04L 5/0058* (2013.01)

(58) Field of Classification Search
CPC ..... H04L 41/34; H04L 5/0044; H04L 5/0053; H04L 5/0058
(Continued)

(56) References Cited

U.S. PATENT DOCUMENTS

2011/0200323 A1 8/2011 Li et al.
2019/0280913 A1* 9/2019 Huang ................... H04L 41/00
(Continued)

FOREIGN PATENT DOCUMENTS

CN 101729358 A 6/2010
CN 109347648 A 2/2019
(Continued)

OTHER PUBLICATIONS

Li et al., "Design and Implementation of FlexE Linear Protection," Wuhan Research Institute of Posts & Telecommunications Wuhan, China; FiberHome Telecommunication Technologies Co. Ltd. Wuhan China; Nov. 2018, vol. 7, No. 6.

*Primary Examiner* — Asad M Nawaz
*Assistant Examiner* — Hugh Mark Ashley
(74) *Attorney, Agent, or Firm* — Price Heneveld LLP

(57) ABSTRACT

This disclosure discloses an operations, administration and maintenance (OAM) message transmission method, apparatus, sending end device, receiving end device and storage medium. The method includes: sending an OAM block by the sending end device; wherein only a single OAM block is sent in each sending period.

18 Claims, 18 Drawing Sheets

(58) Field of Classification Search
USPC ......................................................... 370/329
See application file for complete search history.

(56) References Cited

U.S. PATENT DOCUMENTS

| 2020/0220650 | A1* | 7/2020 | Cheng | ................... | H04L 1/0023 |
| 2022/0329293 | A1* | 10/2022 | Tian | ..................... | H04L 5/1438 |

FOREIGN PATENT DOCUMENTS

| CN | | 110768742 | A | | 2/2020 | | |
| WO | WO-2019056899 | A1 | * | 3/2019 | | ............... | H04L 1/00 |

* cited by examiner

101 generating an OAM block by using an OAM message

102 sending an OAM block carrying an OAM message; wherein only a single OAM block is sent in each sending period

| SH | 0 1 2 3 4 5 6 7 | 8 9 10 11 12 13 14 15 | 16 17 18 19 20 21 22 23 24 25 26 27 28 29 30 31 32 33 34 35 36 37 38 39 | 40 41 42 43 44 45 46 47 48 49 50 51 52 53 54 55 56 57 58 59 60 61 62 63 |
|---|---|---|---|---|
| 1 0 | 0x4B | start ID | OAM type ID | OAM message content | 0xC | populated with 0 or used for OAM message content |

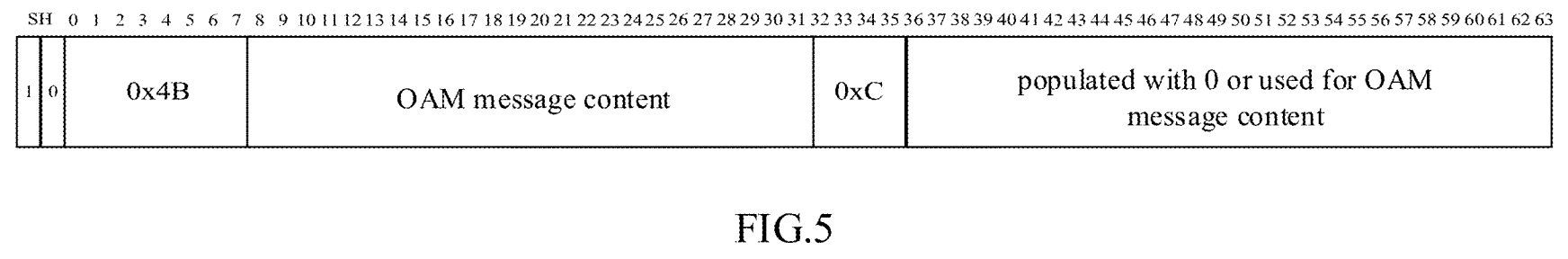

| 1 0 | 0x4B | OAM message content | 0xC | populated with 0 or used for OAM message content |

FIG.5

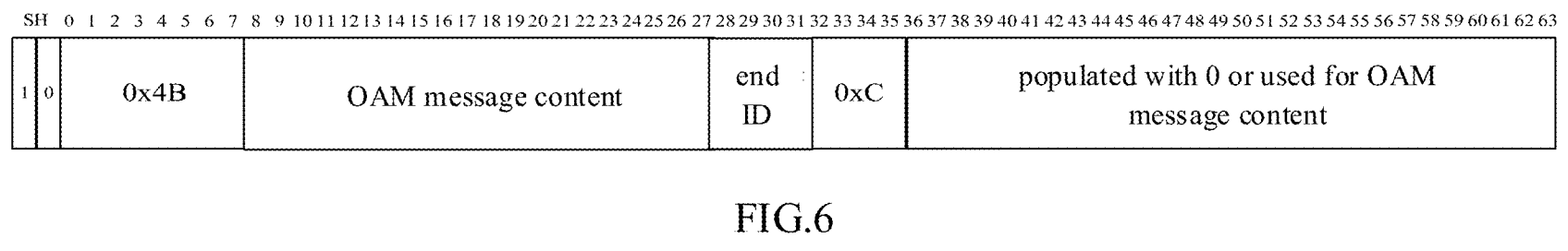

| SH | 0 1 2 3 4 5 6 7 | 8 9 10 11 12 13 14 15 16 17 18 19 20 21 22 23 24 25 26 27 28 29 30 31 32 33 34 35 36 37 38 | 39 40 41 42 43 44 45 46 47 48 49 50 51 52 53 54 55 56 57 58 59 60 61 62 63 |
|---|---|---|---|
| 1 0 | 0x4B | OAM message content | end ID : 0xC |
| | | | populated with 0 or used for OAM message content |

FIG.6

| SH | | 0x4B | message type | used for OAM message content or other | 0xC | populated with 0 |
|---|---|---|---|---|---|---|
| 0 | 0 | | 0 | | | |

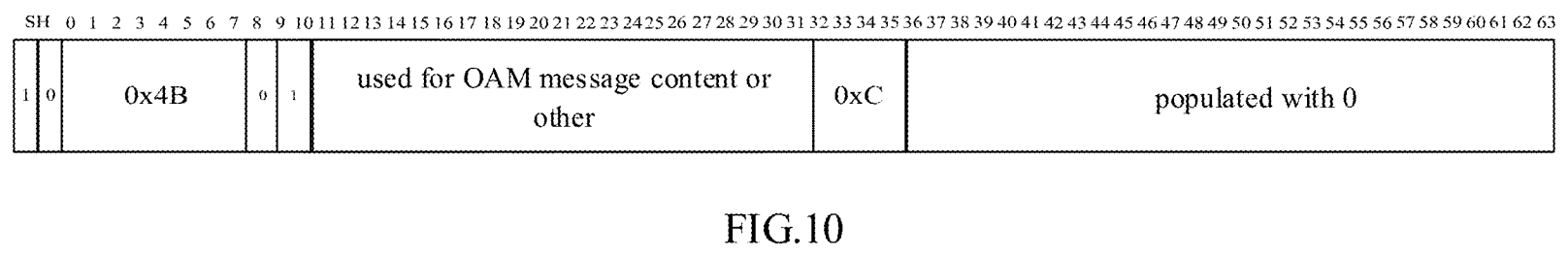

| 1 0 | 0x4B | 0 1 | used for OAM message content or other | 0xC | populated with 0 |

FIG.10

Figure 12:
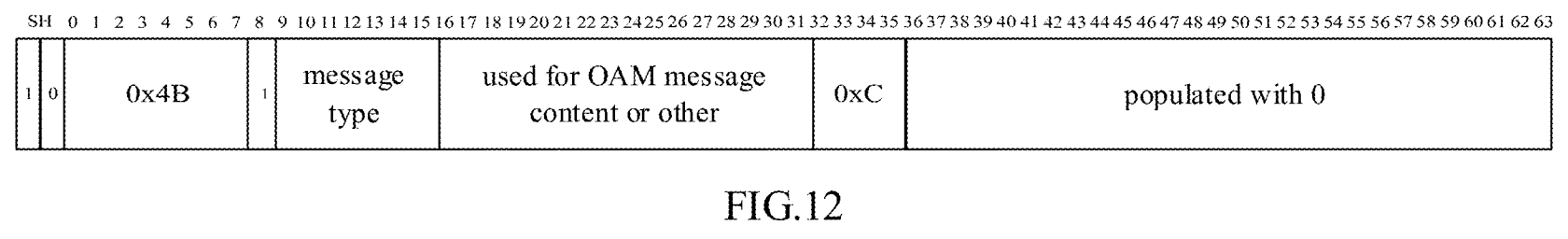

| SH | 0 1 2 3 4 5 6 7 | 8 | 9 10 11 12 13 14 15 16 17 18 19 20 21 22 23 24 25 26 27 28 29 30 31 32 33 34 35 | 36 37 38 39 40 41 42 43 44 45 46 47 48 49 50 51 52 53 54 55 56 57 58 59 60 61 62 63 |
|---|---|---|---|---|
| 1 0 | 0x4B | message type | used for OAM message content or other | 0xC | populated with 0 |

Figure 13:
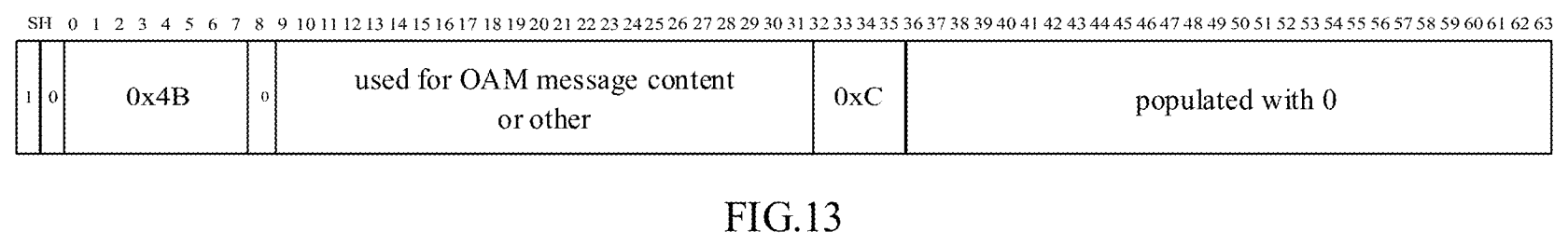

| 0x4B | 0 | used for OAM message content or other | 0xC | populated with 0 |

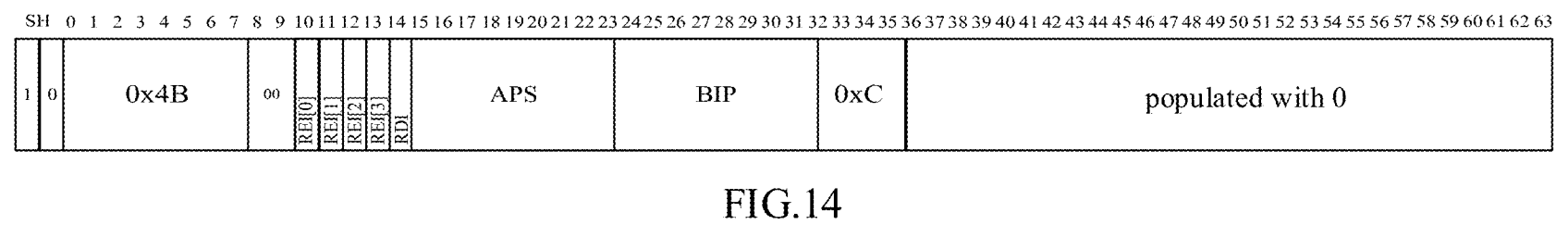

| 1 0 | 0x4B | 00 | REI[0] | REI[1] | REI[2] | REI[3] | RDI | APS | BIP | 0xC | populated with 0 |

FIG.14

OAM MESSAGE TRANSMISSION METHOD AND APPARATUS, RELATED DEVICE AND STORAGE MEDIUM

CROSS-REFERENCE TO RELATED APPLICATION

The present application is a U.S. national phase application of a PCT Application No. PCT/CN2021/098876 filed on Jun. 8, 2021, which claims a priority to Chinese patent application No. 202010514215.0 filed on Jun. 8, 2020, disclosures of which are incorporated herein by reference in their entireties.

TECHNICAL FIELD

The present disclosure relates to the field of communication technologies, and in particular to an operations, administration and maintenance (OAM) message transmission method, an apparatus, a related device and a storage medium.

BACKGROUND

Carrier-class transmission technology needs to support continuity check (CC), connectivity verification (CV), alarm indication signal (AIS), remote defect indication (RDI), customer signal failure indication (CSF) and other alarm detection, and support performance detection and other functions, so that the network has comprehensive OAM functions. Through the comprehensive OAM functions, link connectivity detection and performance detection can be realized, protection switching can be triggered in time, and the operation, administration and maintenance functions for each layer of the network can be realized.

With the increasing demand for ultra-low delay and slicing in the transport network, the time division multiplexing (TDM) format has been introduced into the transport technology for performing channel isolation and slicing. In this case, there is currently no solution to how to transmit an OAM message.

SUMMARY

In order to solve related technical problems, embodiments of the present disclosure provide an OAM message transmission method, apparatus, related device, and storage medium.

The technical solution of the embodiments of the present disclosure is realized as follows.

An embodiment of the present disclosure provides an OAM message transmission method, performed by a sending end device, which includes:

sending an OAM block carrying an OAM message, wherein only a single OAM block is sent in each sending period.

In an optional implementation, at least one field in the OAM block is used for indicating that the block is a block for OAM.

In an optional implementation, a plurality of OAM messages are carried in one OAM block, and the plurality of OAM messages are of different types.

In an optional implementation, one OAM message is carried in at least two OAM blocks.

In an optional implementation, a value of a first field in the OAM block is used for indicating whether the OAM message starts.

In an optional implementation, in case that the value of the first field of the OAM block indicates that the OAM message starts, a second field in the OAM block is used for indicating a type of the OAM message carried in the block.

In an optional implementation, in case that the value of the first field of the OAM block indicates other situation except that the OAM message starts, a second field used for indicating a type of the OAM message is not included in the OAM block.

In an optional implementation, a value of a third field in the OAM block is used for indicating whether the OAM message ends.

In an optional implementation, a third field used for indicating whether the OAM message ends is not included in the OAM block.

In an optional implementation, the OAM block includes a type-1 OAM block and a type-2 OAM block;

after sending of the type-1 OAM block in one period is completed, in case that there is the type-2 OAM block that needs to be sent, the type-2 OAM block is sent in a next period, and the type-1 OAM block is sent in a period immediately following the next period;

in case that there is no type-2 OAM block that needs to be sent, the OAM block is not sent in the next period, and the type-1 OAM block is sent in the period immediately following the next period.

In an optional implementation, one OAM message is carried in a plurality of type-2 OAM blocks;

the type-2 OAM blocks corresponding to a current OAM message are not sent until sending of the type-2 OAM blocks corresponding to a previous OAM message is completed.

In an optional implementation, different types of OAM messages are carried in different types of OAM blocks respectively.

An embodiment of present disclosure provides an OAM message transmission method, performed by a receiving end device, which includes:

receiving only a single OAM block in a period corresponding to one sending period, where an OAM message is carried in the single OAM block.

In an optional implementation, the OAM message is exacted from the received OAM block.

In an optional implementation, at least one field in the OAM block is used for indicating that the block is a block for OAM.

In an optional implementation, a plurality of OAM messages are carried in one OAM block, and the plurality of OAM messages are of different types.

In an optional implementation, one OAM message is carried in at least two OAM blocks.

In an optional implementation, a value of a first field in the OAM block is used for indicating whether the OAM message starts.

In an optional implementation, in case that the value of the first field of the OAM block indicates that the OAM message starts, a second field in the OAM block is used for indicating a type of the OAM message carried in the block.

In an optional implementation, in case that the value of the first field of the OAM block indicates other situation except that the OAM message starts, a second field used for indicating a type of the OAM message is not included in the OAM block.

In an optional implementation, a value of a third field in the OAM block is used for indicating whether the OAM message ends.

In an optional implementation, a third field used for indicating whether the OAM message ends is not included in the OAM block.

In an optional implementation, the OAM block includes a type-1 OAM block and a type-2 OAM block;

after receiving of the type-1 OAM block in the period corresponding to the one sending period is completed, in case that there is the type-2 OAM block that needs to be received, the type-2 OAM block is received in a period corresponding to a next sending period, and the type-1 OAM block is received in a period corresponding to a sending period immediately following the next sending period;

in case that there is no type-2 OAM block that needs to be received, the OAM block is not received in the period corresponding to the next sending period, and the type-1 OAM block is received in a period corresponding to a sending period immediately following the next sending period.

In an optional implementation, one OAM message is carried in a plurality of type-2 OAM blocks;

the type-2 OAM blocks corresponding to a current OAM message are not received until receiving of the type-2 OAM blocks corresponding to a previous OAM message is completed.

In an optional implementation, different types of OAM messages are carried in different types of OAM blocks respectively.

An embodiment of the present disclosure provides an OAM message transmission apparatus, which includes:

a sending unit, configured to send an OAM block carrying an OAM message, wherein only a single OAM block is sent in each sending period.

An embodiment of the present disclosure provides an OAM message transmission apparatus, which includes:

a receiving unit, configured to receive only a single OAM block in a period corresponding to one sending period, wherein an OAM message is carried in the single OAM block.

An embodiment of the present disclosure provides a sending end device, which includes: a first processor and a first communication interface, where the first communication interface is configured to send an OAM block carrying an OAM message, wherein only a single OAM block is sent in each sending period.

An embodiment of the present disclosure provides a receiving end device, which includes: a second communication interface and a second processor, where the second communication interface is configured to receive only a single OAM block in a period corresponding to one sending period, wherein an OAM message is carried in the single OAM block.

An embodiment of the present disclosure provides a sending end device, which includes: a first processor and a first memory configured to store a computer program executable by the first processor, where the first processor is configured to execute the computer program, to implement the steps of foregoing method performed by the sending end device.

An embodiment of the present disclosure provides a receiving end device, which includes: a second processor and a second memory configured to store a computer program executable by the second processor, where the second processor is configured to execute the computer program, to implement the steps of foregoing method performed by the receiving end device.

An embodiment of the present disclosure provides a storage medium storing thereon a computer program, the computer program is configured to be executed by a processor, to implement the steps of foregoing method performed by the sending end device, or the steps of foregoing method performed by the receiving end device.

In the OAM message transmission method, apparatus, related device, and storage medium provided in the embodiments of the present disclosure, the sending end device sends an OAM block carrying an OAM message; in each sending period, only one OAM block is sent; and the receiving end device receives only one OAM block in a period corresponding to one sending period; the OAM message is carried in the OAM block, the OAM block is sent periodically, and only a single OAM block is sent in each period, thereby realizing the OAM message transmission method suitable for the TDM channel.

BRIEF DESCRIPTION OF THE DRAWINGS

FIG. 4 is a schematic view of a frame format of a first block in the multiple OAM blocks according to an embodiment of the present disclosure;

FIG. 5 is a schematic view of a frame format of a block other than the first block in the multiple OAM blocks according to an embodiment of the present disclosure;

FIG. 6 is a schematic view of a frame format of a last block in the multiple OAM blocks according to an embodiment of the present disclosure;

FIG. 8 is a schematic view of another frame format of the first block in the multiple OAM blocks according to an embodiment of the present disclosure;

FIG. 9 is a schematic view of another frame format of a block other than the first block and the last block in the multiple OAM blocks according to an embodiment of the present disclosure;

FIG. 10 is a schematic view of another frame format of the last block in the multiple OAM blocks according to an embodiment of the present disclosure;

FIG. 12 is a schematic view of still another frame format of the first block in the multiple OAM blocks according to an embodiment of the present application;

FIG. 13 is a schematic view of still another frame format of a block other than the first block in the multiple OAM blocks according to an embodiment of the present disclosure;

FIG. 14 is a schematic view of still another frame format of an OAM block according to an embodiment of the present disclosure;

DETAILED DESCRIPTION

The present disclosure will be further described in detail below in conjunction with the drawings and embodiments.

Common OAM functions include: CC; CV; bit interleaved parity (BIP); remote error indication (REI); RDI; delay measurement (one-way delay measurement (1 DM)/two-way delay measurement (2 DM)); automatic protection switching (APS); client signal type (CS); client signal failure (CSF), etc.

An OAM message is a signal or information for realizing the above-mentioned OAM functions. Since the signals or information corresponding to various kinds of OAM messages are different, different OAM messages are different in length.

In a packet network, an OAM message is carried by a special packet message. The OAM message uses a label stack similar to the forwarding label carried by the data packet, to ensure that the OAM message is correctly forwarded on the packet transmission path.

With the increasing demand of transport network for ultra-low delay and slicing, the TDM format has been introduced into the transport technology for performing channel isolation and slicing. For the TDM channel, the TDM processing is not necessarily aware of the identifier at the packet message level, so the aforementioned packet-based OAM message transmission method is no longer applicable, and an OAM message transmission method suitable for the TDM mechanism is required.

Based on this, in various embodiments of the present disclosure, the OAM block uses the block type of the TDM channel, and is sent periodically, and only a single OAM block is sent each time, and another block is sent in the next period.

In the embodiments of the present disclosure, the OAM block uses the block type of the TDM channel, and the OAM block is sent periodically, and only a single OAM block is sent each time. In this way, the OAM message transmission method suitable for the TDM channel is realized.

Figure 1:
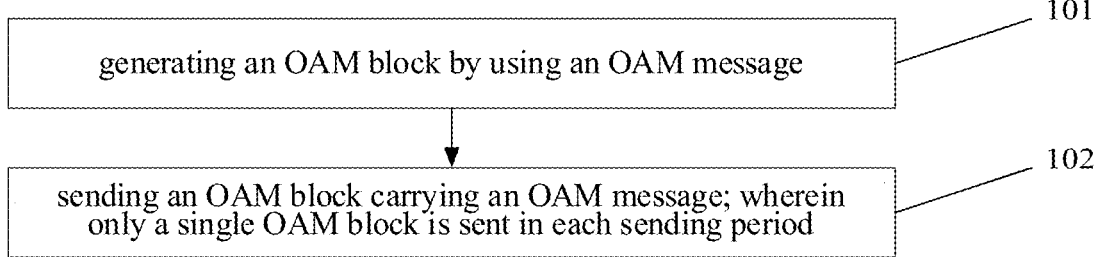
FIG. 1 is a flowchart of an OAM message transmission method on a sending end device side according to an embodiment of the present disclosure.

An embodiment of the present disclosure provides an OAM message transmission method, performed by a sending end device, as shown in FIG. 1, the method includes:

Step 102: sending an OAM block carrying an OAM message; wherein only a single OAM block is sent in each sending period.

In practice, prior to the sending the OAM block, the OAM block needs to be generated.

Based on this, as shown in FIG. 1, before step 102, the method may further include:

Step 101: generating an OAM block by using an OAM message.

In practice, the sending end device may be a slicing packet network (SPN) device or a metropolitan transport network (MTN) device or the like.

In the step 101, the OAM block adopts the block type of the TDM channel, that is, the OAM block adopts the block type corresponding to the TDM channel, such as a 66-bit (B) block or a 257 B block.

In practice, for the OAM block, it is necessary to identify the block as a block for OAM, so that the receiving end device can know that the block is an OAM block.

Based on this, in an embodiment, when generating the OAM block, the method may include:

setting at least one field in the OAM block, wherein the at least one field is used for identifying the block as the OAM block.

That is, at least one field in the OAM block is used for indicating that the block is an OAM block. Exemplarily, "10" (one field) indicates that the block is a control block, and a block type of 0x4B (one field) and 0 code of 0xC (one field) are used as the identifier of a single OAM block.

In practice, a block may be identified as a control block. In this way, the block can be distinguished from a data block, an idle block, etc., so that the receiving end device can know that the block is a control block.

Based on this, in an embodiment, when generating the OAM block, the method may include:

setting a value of one field in the OAM block, wherein the value of the field is used for identifying the block as a control block.

Figure 2:
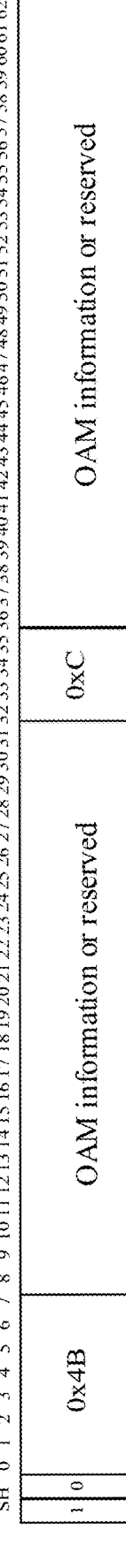
FIG. 2 is a schematic view of an OAM block frame format according to an embodiment of the present disclosure.

Exemplarily, it is assumed that the OAM block is a 66B block, and the frame format of the OAM block shown in FIG. 2 may be used. In FIG. 2, "10" (one field) represents that the block is a control block, the 0x4B+0xC represent that the block is the OAM block (rather than other control blocks), and fields in the block other than the identifiers may be used for carrying OAM information, or some bits are used as reserved bytes.

Here, it should be noted that the frame format of the OAM block is not limited in the embodiments of the present disclosure.

In practice, since the information carried by the OAM messages are different, different OAM messages are of different lengths. Taking SPN as an example, the corresponding TDM sequence is based on the 66B block. During the OAM message insertion process, the order of blocks needs to be maintained, which means that a long piece of OAM information must be distributed in a plurality of blocks for transmission. Therefore, at least one OAM block can be generated from one OAM message, that is, at least one OAM block can be generated based on one OAM message.

Based on this, according to the length of one OAM message, there can be the following two situations.

In the first situation, one OAM block is generated by using one OAM message, that is, only a single OAM block is generated by using one OAM message.

In the second situation, the length of the OAM message is greater than the length available to one block, and one OAM message is broken down into a plurality of OAM blocks for transmission. At this time, at least two OAM blocks are generated by using one OAM message, that is, the plurality of OAM blocks are generated by using one OAM message, that is, one OAM message is carried in at least two OAM blocks.

Figure 3:
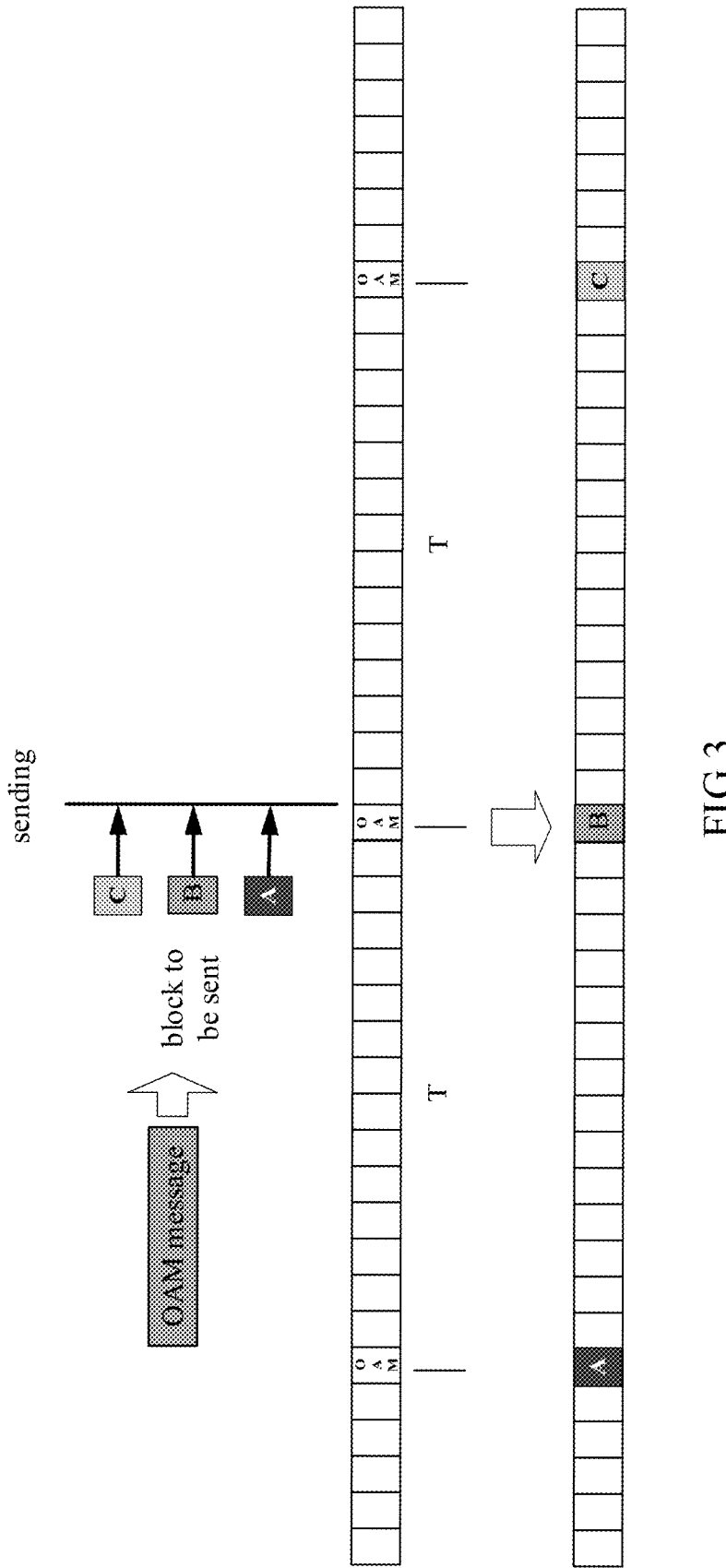
FIG. 3 is a schematic view showing transmission of multiple OAM blocks according to an embodiment of the present disclosure.

When the plurality of OAM blocks are generated, since only one OAM block can be sent in one sending period, a plurality of sending periods are required to send the plurality of OAM blocks; exemplarily, as shown in FIG. 3, the OAM message is divided into three OAM blocks, that is, divided into three sections of contents for transmission. It is assumed that three OAM blocks are A, B, and C respectively, since the OAM blocks are sent periodically, it is necessary to populate the A, B, and C into three periodic OAM blocks for transmission.

In order to enable the receiving end device to correctly process the plurality of OAM blocks that are not sent at the same time, the sending end device also needs to perform some processing.

Based on this, in an embodiment, after completing sending of one OAM message, that is, after completing sending of the plurality of OAM blocks generated from one OAM message, another OAM message is sent; when different OAM messages are sent (which correspond to the same type of OAM blocks), the next OAM message can only be sent after sending of an OAM message at a plurality of OAM block positions is completed. In this way, the receiving end device can be guaranteed to correctly process the plurality of OAM blocks of one OAM message.

In practice, in order to enable the receiving end device to correctly process the plurality of OAM blocks that are not sent at the same time, a first field may also be carried in the OAM block, and the value of the first field is used for indicating whether the OAM message starts; specifically, a start identifier of multiple blocks may be carried in the first OAM block of the multiple OAM blocks, where the start identifier of the multiple blocks is used for delimiting, indicating the first block of the OAM message broken down into the multiple blocks for transmission, which means that a new OAM message starts to be sent.

Here, the first block refers to a block in the at least two OAM blocks that is sent firstly, that is, the block sent first in the at least two OAM blocks.

When the value of the first field of the OAM block indicates that the OAM message starts, the second field in the OAM block is used for indicating the type of the OAM message carried in the block, that is to say, an OAM type identifier, that is, an OAM message type, may also be carried in the first OAM block of the plurality of OAM blocks, where the OAM type identifier is used for identifying the type of OAM message, such as CV, one-way delay measurement (1 DM), two-way delay measurement message (2 DMM), and two-way delay measurement reply (2DMR) and other different types.

Exemplarily, in practice, it is assumed that the OAM block is a 66B block, then the first block in the OAM block can adopt the frame format of the OAM block shown in FIG. 4. In FIG. 4, "10" represents that the block is a control block, the 0x4B+0xC represent that the block is an OAM block (rather than other control blocks), and fields other than the identifiers in the block can be used for carrying OAM information (i.e., OAM message content), or some bits are populated with 0. The start identifier and the OAM type identifier are in fixed bit positions, and the message content of the first block needs to be placed after the OAM type identifier.

It should be noted that, in practice, to expand the application, the frame structure may also include other fields besides the information shown in FIG. 4, and the frame format of the OAM block is not limited in the embodiments of the present disclosure.

In an embodiment, when the value of the first field of the OAM block indicates other situation except that the OAM message starts (that is, for other blocks than the first block in the plurality of blocks), a second field used for indicating the type of the OAM message is not included in the OAM block.

Here, since the blocks are sent in sequence, for those OAM blocks other than the first block and the last block in the plurality of OAM blocks, that is, for other blocks than the first block and the last block in the plurality of OAM blocks, an implementation manner is that: the blocks may be dispensed with the start identifier and OAM type identifier involved in the first block. Bit positions corresponding to the start identifier and the OAM type identifier involved in the first block may be populated with the OAM message content.

Correspondingly, for the last OAM block in the plurality of OAM blocks, when the receiving end device already knows the length of an OAM message according to the OAM type (for example, the OAM type identifier is carried in the first block of the plurality of OAM blocks), an end identifier may not be added in the last OAM block. At this time, the frame structure of the last OAM block may be the same as the frame structure of other blocks than the first block and the last block in the plurality of OAM blocks.

Based on this, in an embodiment, for blocks other than the first block in the at least two OAM blocks, the second field is not provided.

Exemplarily, it is assumed that the OAM block is a 66B block, and the frame format shown in FIG. 5 may be used for blocks other than the first block in the at least two OAM blocks. In FIG. 5, "10" represents that the block is a control block, and the 0x4B+0xC represent that the block is an OAM block (rather than other control blocks). Fields in the block other than identifiers can be used for carrying OAM information (that is, OAM message content), or some bits are populated with 0.

In practice, in order to enable the receiving end device to correctly process the plurality of OAM blocks that are not sent at the same time, an end identifier may also be added in the last block of the plurality of OAM blocks, to represent that the last block of an OAM message sent in multiple blocks is reached.

Based on this, in an embodiment, the value of the third field in the OAM block is used for indicating whether the OAM message ends.

Exemplarily, it is assumed that the OAM block is a 66B block, and for the last block in the OAM blocks, the frame format shown in FIG. 6 may be used. In FIG. 6, "10" represents that the block is a control block, and the 0x4B+0xC represent that the block is an OAM block (rather than other control blocks or data blocks). The end identifier (the third field) is at a fixed bit position. Other fields in the block that are other than the identifiers and after the OAM message content may be used for carrying OAM information (that is, the OAM message content), or some bits are populated with 0.

Here, if the receiving end device can know the length of an OAM message according to the value of the second field in the corresponding OAM block, the third field is not provided in the last OAM block.

Figure 7:
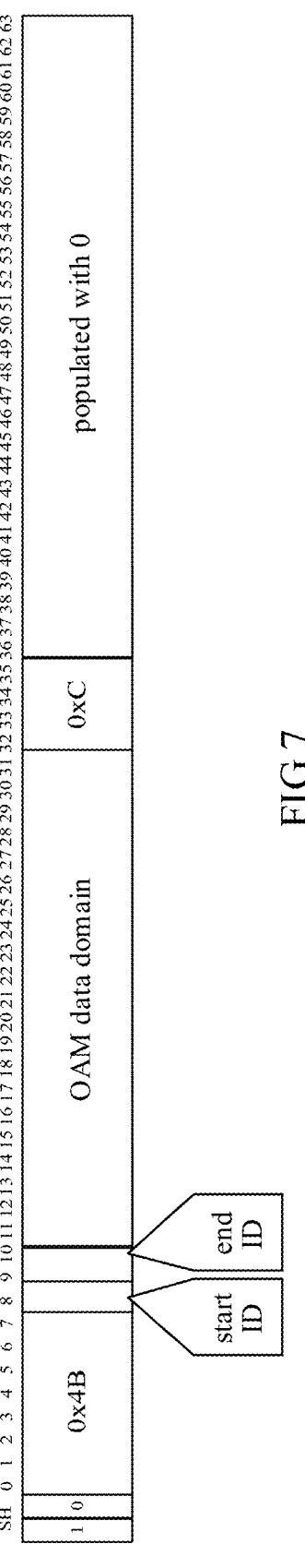
FIG. 7 is a schematic view of another frame format of a block in the multiple OAM blocks according to an embodiment of the present disclosure.

In addition to the above-mentioned frame formats, exemplarily, for the plurality of OAM blocks, assuming that the OAM blocks are 66B blocks, the frame format shown in FIG. 7 may also be used. In FIG. 7, "10" identifies the block as a control block, the 0x4B+0xC represent that the block is an OAM block (rather than other control blocks or data blocks), and the block also includes a start identifier and an end identifier. The start identifier is used for indicating whether the OAM message starts. Exemplarily, the value being 1 indicates that the OAM message starts. At this time, the block is the first OAM block in the plurality of OAM blocks. The value being 0 indicates other situation except the starting of an OAM message. Other fields except the identifiers in the block may be used for carrying OAM information (that is, the OAM message content).

Figure 8:
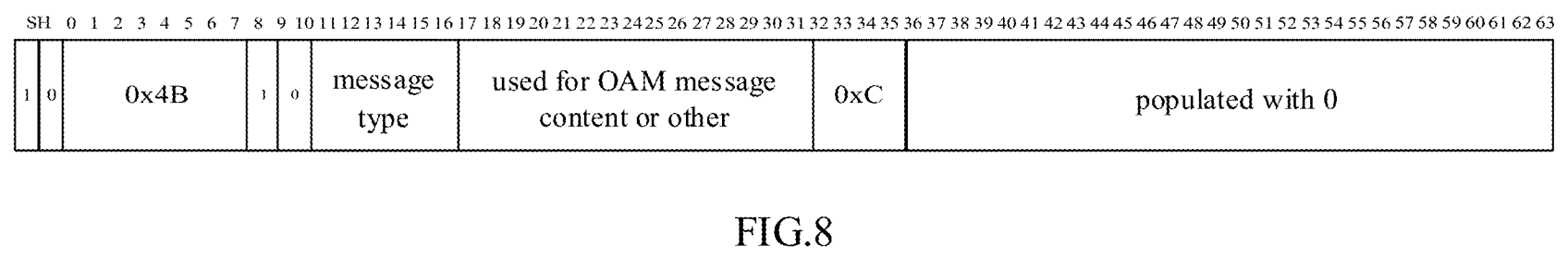

Specifically, for the first block in the plurality of OAM blocks, the frame structure shown in FIG. 8 may be used. The start identifier is set to 1, which indicates the OAM message starts, and the end identifier is set to 0, which indicates that the OAM message does not end, and the message type field identifies the type of the OAM message carried in the block. Different types of OAM messages may correspond to different field values respectively. For example, different types of OAM messages may adopt the values shown in Table 1.

TABLE 1

| OAM message type (type) | field value |
|---|---|
| CV | 0X11 |
| 1DM | 0X12 |
| 2DMM | 0X13 |
| 2DMR | 0X14 |

Figure 9:
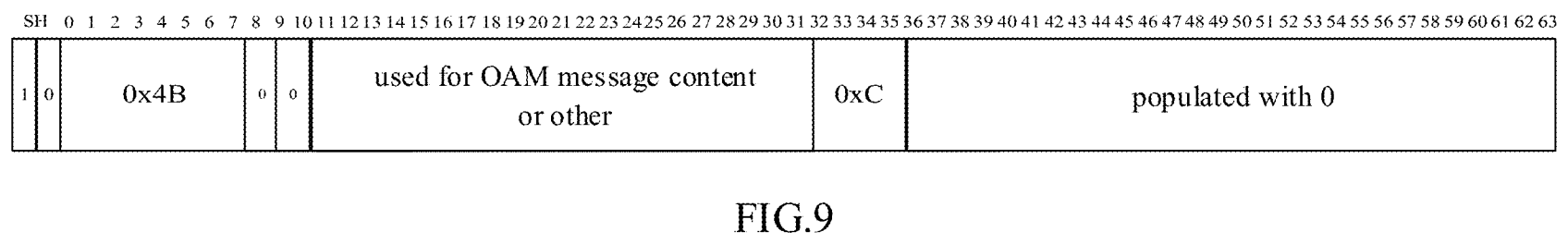

For other blocks except the first block and the last block in the OAM blocks, the frame structure shown in FIG. 9 may be used. The start identifier is set to 0, which indicates other situation except that the OAM message starts, and the end identifier is set to 0, which indicates that the OAM message does not end.

For the last block in the OAM blocks, the frame structure shown in FIG. 10 may be used. The start identifier is set to 0, which indicates other situation except that the OAM message starts, and the end identifier is set to 1, which indicates that the OAM message ends.

Figure 11:
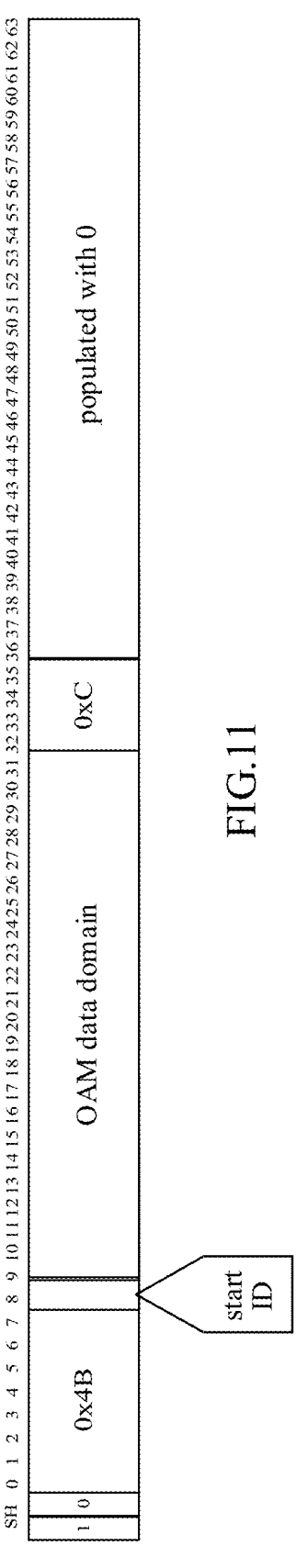
FIG. 11 is a schematic view of still another frame format of a block in the multiple OAM blocks according to an embodiment of the present disclosure.

In practice, it is assumed that the OAM block is a 66B block. When the receiving end device knows the OAM message type in advance, the frame format shown in FIG. 11 may also be used for the plurality of OAM blocks. In FIG. 11, "10" identifies the block as a control block, the 0x4B+0xC represent that the block is an OAM block (rather than other control blocks or data blocks), and the block also includes a start identifier, the start identifier is used for indicating whether the OAM message starts. Exemplarily, the value being 1 indicates that the OAM message starts. At this time, the block is the first OAM block in the plurality of OAM blocks. The value being 0 indicates other situation except that the OAM message starts. Other fields except the identifiers in the block may be used for carrying OAM information (that is, the OAM message content) or used for other purposes (e.g., reserved bits, parity bits, etc.).

Specifically, for the first block in the plurality of OAM blocks, the frame structure shown in FIG. 12 may be used. The start identifier being set to 1 indicates that the OAM message starts, the end identifier being set to 0 indicates that the OAM message does not end, and the message type field identifies the type of the OAM message carried in the block. The different types of OAM messages may correspond to different field values respectively. For example, the different types of OAM messages may adopt the values shown in Table 1.

For other blocks in the plurality of OAM blocks, the frame structure shown in FIG. 13 may be used. The start identifier is set to 0, which indicates other situation except that the OAM message starts.

For the last block in the plurality of OAM blocks, since the length of each type of OAM message is determined, the type of the OAM message implies the length of the OAM message, and there is no need to directly carry the length information in the block. The receiving end device can know the length of the OAM message according to the message type identifier field, and therefore, the end identifier may be omitted.

In practice, a plurality of OAM messages may also be carried in one OAM block, and the plurality of OAM messages are of different types. Exemplarily, it is assumed that the OAM block is a 66B block, and may adopt the frame format of the OAM block as shown in FIG. 14. In FIG. 14, "10" represents that the block is a control block, the 0x4B+ 0xC represent that the block is an OAM block (rather than other control blocks), and "00" represents the type of OAM block, which can be specifically the type-1; different bits indicate that different types of OAM messages (information) (which can also be understood as OAM signals) such as REI, RDI, APS, and BIP are carried in the block. Other fields except the identifiers can be used for carrying OAM information (i.e., OAM message content). Different types of OAM messages can be carried in different types of OAM blocks (using block types of TDM channels) respectively, in other words, different types of OAM blocks carry different types of OAM messages respectively.

In practice, which type of OAM block to use can be determined according to different characteristics of the OAM message (such as importance, whether it needs to be sent strictly periodically, whether it is sent on demand, the length of the message).

Figure 15:
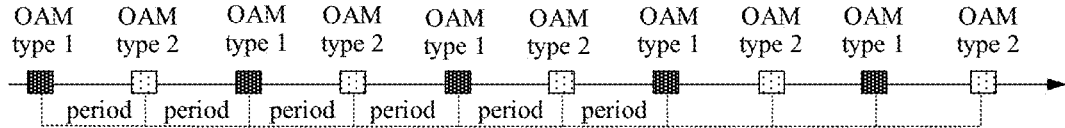
FIG. 15 is a schematic view showing transmission of various types of OAM blocks according to an embodiment of the present disclosure.

As shown in FIG. 15, different types of OAM blocks are sent alternately, so that all types of OAM can get sending opportunities, in this way, too long waiting time for sending of a certain type of OAM block can be avoided.

Specifically, in an embodiment, the OAM block includes a type-1 OAM block and a type-2 OAM block;

after sending of the type-1 OAM block in one period is completed, in case that there is the type-2 OAM block that needs to be sent, the type-2 OAM block is sent in a next period, and the type-1 OAM block is sent in a period immediately following the next period;

in case that there is no type-2 OAM block that needs to be sent, the OAM block is not sent in the next period, and the type-1 OAM block is sent in the period immediately following the next period.

Figure 16:
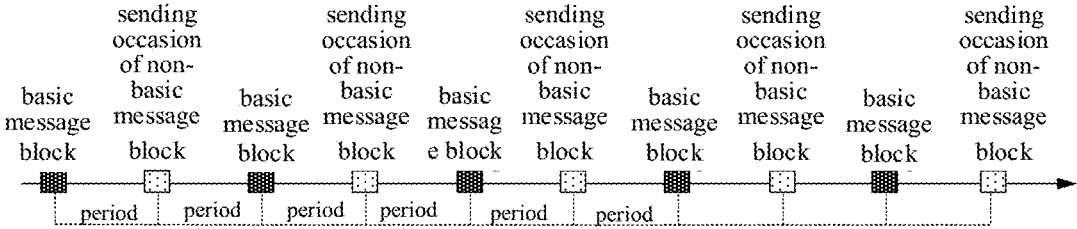
FIG. 16 is a schematic view of sending occasions of basic message blocks and non-basic message blocks according to an embodiment of the present disclosure.
Figure 17:
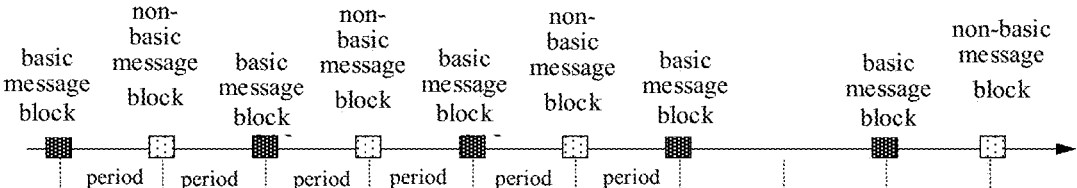
FIG. 17 is a schematic view showing transmission of basic message blocks and non-basic message blocks according to an embodiment of the present disclosure.

Exemplarily, the type-1 OAM block is a basic message block, and the type-2 OAM block is a non-basic message block. Common basic OAM messages such as REI, RDI, and APS may be carried in the type-1 OAM block, which is sent periodically. The type-2 OAM block is used for carrying non-basic OAM information such as CV, 1 DM, and 2 DM. When sending the type-1 and the type-2 OAM blocks, if there is a non-basic message block that needs to be sent at the sending occasion of the non-basic message block, the non-basic message block is sent, as shown in FIG. 16; if there is no non-basic message block that needs to be sent at the sending occasion of the non-basic message block, no OAM block is sent. Therefore, the sending situation as shown in FIG. 17 may occur during actual sending. In FIG. 17, at one occasion of non-basic message block, no OAM block is sent.

Here, since different types of OAM blocks are sent alternately, when a plurality of OAM blocks are required to transmit a type of OAM message, the plurality of OAM blocks can only be transmitted at the transmission occasions of the type of OAM blocks corresponding to the type of OAM message.

In practice, when the same type of OAM blocks are used to transmit multiple OAM messages, when sending of one OAM message among the multiple OAM messages has started at the sending end device, only when the sending of the OAM message over a plurality of periods is completed, another OAM message can be sent in the next period.

In other words, one OAM message is carried in a plurality of OAM blocks of the same type; a plurality of OAM blocks corresponding to a current OAM message cannot be sent until sending of a plurality of OAM blocks corresponding to a previous OAM message is completed.

Specifically, in an embodiment, one OAM message is carried in a plurality of type-1 OAM blocks;

the plurality of type-1 OAM blocks corresponding to a current OAM message are not sent until sending of the type-1 OAM blocks corresponding to a previous OAM message is completed.

Figure 18:
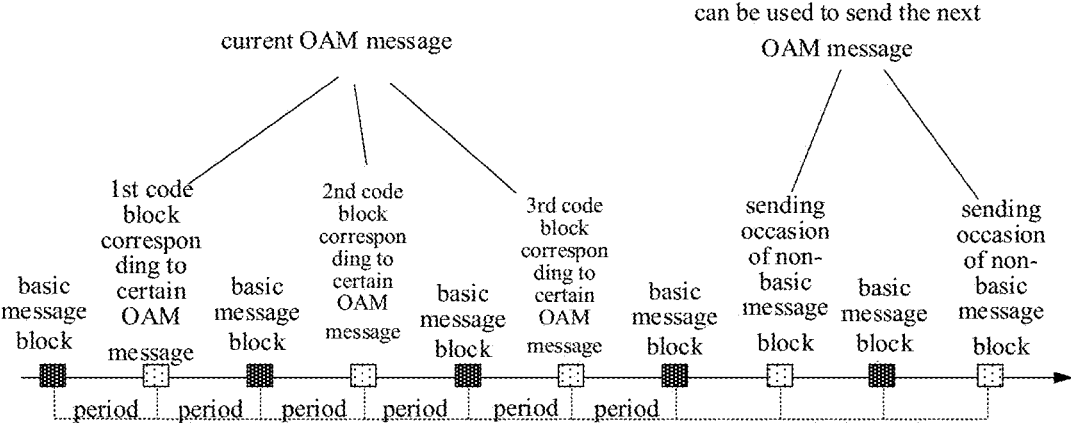
FIG. 18 is a schematic view showing transmission of a plurality of OAM messages according to an embodiment of the present disclosure.

Exemplarily, it is assumed that three type-2 OAM blocks are required to send the current OAM message completely, when the sending of the current OAM message is completed after a sending period occasion of the third type-2 OAM block, the next OAM message can be sent at the sending occasions of type-2 OAM block, as shown in FIG. 18. That is to say, when the sending of the type-2 OAM blocks corresponding to a certain OAM message is not completed, the type-2 blocks corresponding to other OAM message cannot be sent.

In an embodiment, one OAM message is carried in a plurality of type-2 OAM blocks;

the plurality of type-2 OAM blocks corresponding to a current OAM message are not sent until sending of the type-2 OAM blocks corresponding to a previous OAM message is completed.

In an embodiment of the present disclosure, OAM messages are categorized according to different OAM message lengths, and can be transmitted using different types of OAM blocks: for OAM information with a shorter length (which can be transmitted in a single block), the information is defined in a bit-by-bit manner (for example, as shown in FIG. 14, each bit is used to represent the OAM message such as REI and RDI) in a single OAM block, so that the transmission of the information is completed in the single OAM block; for OAM information with a longer length, a manner of message populating definition is used, that is, the OAM message is populated in an area, instead of using a single bit to represent an OAM message, and the above-mentioned scheme involving multiple blocks can be used to complete the transmission of one message. The complete OAM mechanism provided by the embodiments of the present disclosure combines the bit-by-bit manner and the message populating manner.

Figure 19:
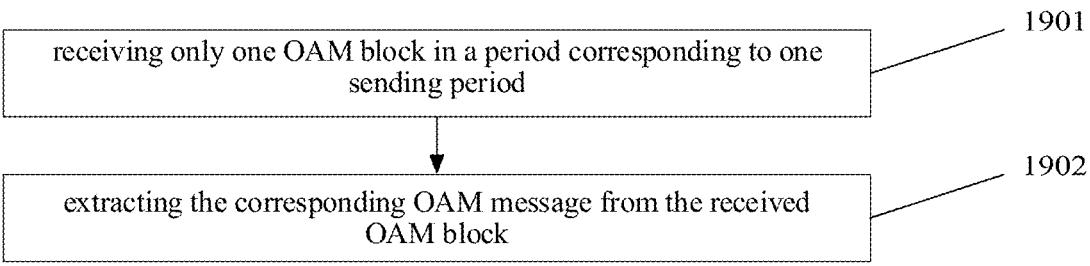
FIG. 19 is a flowchart of an OAM message transmission method on a receiving end device side according to an embodiment of the present disclosure.

Correspondingly, the embodiments of the present disclosure also provide an OAM message transmission method, performed by the receiving end device, as shown in FIG. 19, the method includes:

Step 1901: receiving only one OAM block in a period corresponding to one sending period.

The OAM block is generated from the OAM message, that is, the OAM message is carried in the OAM block, and block type of the TDM channel is used by the OAM block.

After receiving the OAM block, the receiving end device obtains the corresponding OAM message from the OAM block.

Based on this, as shown in FIG. 19, the method may further include:

Step 1902: extracting the corresponding OAM message from the received OAM block.

In actual application, the receiving end device may be an SPN device or an MTN device or the like.

In one embodiment, the method may also include:

parsing the received OAM block to obtain at least one field, wherein the obtained at least one field is used for indicating that the block is an OAM block.

In an embodiment, when the sending end device uses one OAM message to generate one OAM block, the OAM block received in a period corresponding to one sending period is a single OAM block generated from one OAM message; correspondingly, a complete OAM message is extracted from the received OAM block; for the convenience of use, the receiving end device stores the OAM message after obtaining it.

In an embodiment, when the sending end device uses one OAM message to generate at least two OAM blocks, that is, when one OAM message is carried in at least two OAM blocks, the OAM block received in a period corresponding to one sending period is one of at least two OAM blocks generated from the one OAM message; correspondingly, the OAM message received in a period corresponding to one sending period is a partial content of one OAM message; the receiving end device combines the extracted OAM messages according to the receiving sequence of the plurality of received OAM blocks, thereby obtaining a complete OAM message, and stores it.

In an embodiment, when the sending end device uses a plurality of different types of OAM messages to generate one OAM block, that is, when a plurality of OAM messages of different types are carried in one OAM block, the OAM block received by the receiving end device in a period corresponding to one sending period is a single OAM block generated from the plurality of different types of OAM messages; correspondingly, the plurality of different types of OAM messages are extracted from the received OAM block, and are stored.

In an embodiment, when one OAM message is carried in at least two OAM blocks, the receiving end device performs the parsing on the received OAM blocks to obtain the first field, wherein the value of the first field is used for indicating whether the OAM message starts.

In case that the value of the first field of the OAM block indicates that the OAM message starts, when the received OAM block is parsed, a second field is further obtained, wherein the second field in the OAM block is used for indicating a type of OAM message carried in the block.

Here, if the receiving end device knows the length of the OAM message based on the value of the corresponding second field, when the receiving end device has received the OAM message that meets the message length, that is, when the total length of the OAM information corresponding to the plurality of OAM blocks received by the receiving end device reaches the length of the corresponding OAM message, the receiving end device considers that the entire OAM message content has been obtained, so that the receiving end device can obtain the entire content of the corresponding OAM message.

In an embodiment, when parsing the received OAM block, a third field is also obtained, wherein the value of the third field is used for indicating whether the OAM message ends.

Here, when the receiving end device determines based on the value of the third field that a plurality of OAM blocks corresponding to one OAM message have been received, the receiving end device considers that the entire OAM message content has been obtained, so that the receiving end device can obtain the entire content of the OAM message.

In practice, if the receiving end device has not received an indication of the last block of the polarity of OAM blocks within a certain period of time (which can be set according to needs), it means that the corresponding OAM message has an error and has not been received completely, the receiving end device can generate corresponding alarms and report corresponding alarms, for example, report corresponding alarms to a management and control system or a maintenance terminal, etc.

In practice, the receiving end device extracts corresponding OAM information from the message content domain in the OAM block.

In an embodiment, the OAM block includes a type-1 OAM block and a type-2 OAM block;

after completing receiving of the type-1 OAM block in a period corresponding to one sending period, in case that there is the type-2 OAM block that needs to be received, the type-2 OAM block is received in a period corresponding to a next sending period, and the type-1 OAM block is received in a period corresponding to a sending period immediately following the next sending period;

in case that there is no type-2 OAM block that needs to be received, the OAM block is not received in the period corresponding to the next sending period, and the type-1 OAM block is received in a period corresponding to a sending period immediately following the next sending period.

In an embodiment, one OAM message is carried in a plurality of type-2 OAM blocks;

the type-2 OAM blocks corresponding to a current OAM message are not received until receiving of the type-2 OAM blocks corresponding to a previous OAM message is completed.

Figure 20:
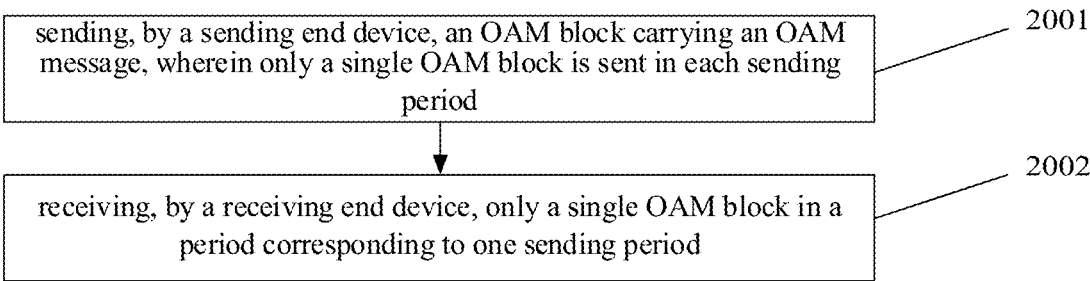
FIG. 20 is a flowchart of an OAM message transmission method according to an embodiment of the present disclosure.

An embodiment of the present disclosure also provides an OAM message transmission method, as shown in FIG. 20, the method includes:

Step 2001: sending, by a sending end device, an OAM block carrying an OAM message, wherein only a single OAM block is sent in each sending period;

Step 2002: receiving, by a receiving end device, only a single OAM block in a period corresponding to one sending period.

Here, it should be noted that: the specific processing processes of the sending end device and the receiving end device have been described in detail above, and will not be repeated here.

In the OAM message transmission method provided by the embodiments of the present disclosure, the sending end device sends an OAM block carrying an OAM message, wherein only a single OAM block is sent in each sending period; and the receiving end device receives only one OAM block in a period corresponding to one sending period. The OAM blocks are sent periodically, and only a single OAM block is sent each time, thereby realizing an OAM message transmission manner suitable for TDM channels.

In addition, for the plurality of OAM blocks, corresponding fields are provided, so that the sending end device and the receiving end device can correctly process the plurality of OAM blocks not sent at the same time.

Figure 21:
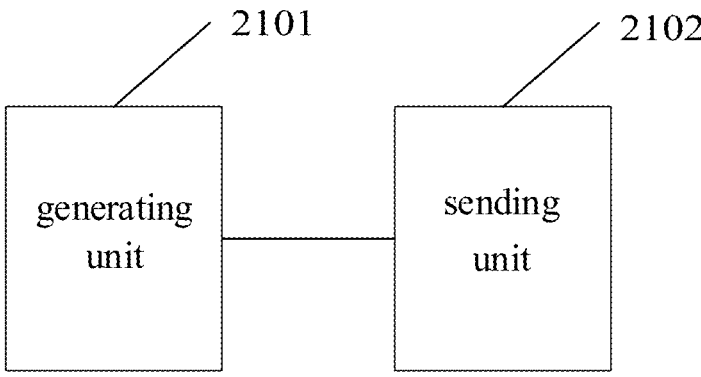
FIG. 21 is a schematic structural view of an OAM message transmission apparatus according to an embodiment of the present disclosure.

In order to implement the method of the embodiments of the present disclosure, an embodiment of the present disclosure also provides an OAM message transmission apparatus, which is provided on a sending end device, as shown in FIG. 21, the apparatus includes:

a sending unit 2102, configured to send an OAM block carrying an OAM message, wherein only a single OAM block is sent in each sending period.

In an embodiment, as shown in FIG. 21, the apparatus may further include:

a generating unit 2101, configured to generate an OAM block by using an OAM message, where the OAM block uses a block type of a TDM channel.

In an embodiment, the sending unit 2102 is configured so that the OAM block includes a type-1 OAM block and a type-2 OAM block;

after sending of the type-1 OAM block in one period is completed, in case that there is the type-2 OAM block that needs to be sent, the type-2 OAM block is sent in a next period, and the type-1 OAM block is sent in a period immediately following the next period;

in case that there is no type-2 OAM block that needs to be sent, the OAM block is not sent in the next period, and the type-1 OAM block is sent in the period immediately following the next period.

In an embodiment, the sending unit 2102 is configured so that one OAM message is carried in a plurality of type-2 OAM blocks;

the type-2 OAM blocks corresponding to a current OAM message are not sent until sending of the type-2 OAM blocks corresponding to a previous OAM message is completed.

In actual application, the generating unit 2101 may be realized by a processor in the OAM message transmission apparatus; and the sending unit 2102 may be realized by a communication interface in the OAM message transmission apparatus.

Figure 22:
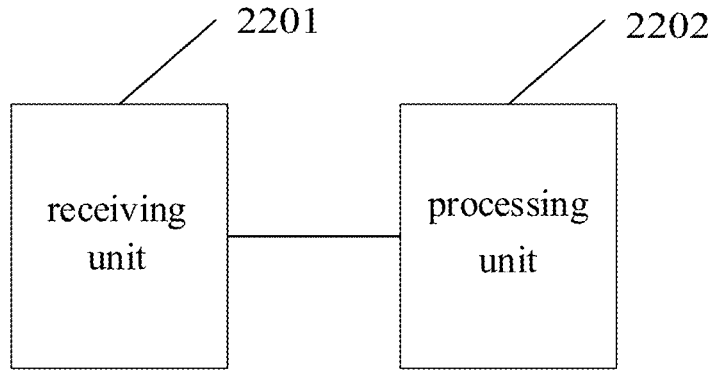
FIG. 22 is a schematic structural view of another OAM message transmission apparatus according to an embodiment of the present disclosure.

In order to implement the method of the receiving end device side according to the embodiments of the present disclosure, the embodiments of the present disclosure also provide an OAM message transmission apparatus, which is provided on a receiving end device, as shown in FIG. 22, the apparatus includes:

a receiving unit 2201, configured to receive only a single OAM block in a period corresponding to one sending period, wherein an OAM message is carried in the single OAM block.

In an embodiment, as shown in FIG. 22, the apparatus may also include:

a processing unit 2202, configured to extract a corresponding OAM message from the received OAM block.

In an embodiment, the OAM block includes a type-1 OAM block and a type-2 OAM block; and the receiving unit 2201 is configured so that:

after completing receiving of the type-1 OAM block in a period corresponding to one sending period, in case that there is the type-2 OAM block that needs to be received, the type-2 OAM block is received in a period corresponding to a next sending period, and the type-1 OAM block is received in a period corresponding to a sending period immediately following the next sending period;

in case that there is no type-2 OAM block that needs to be received, the OAM block is not received in the period corresponding to the next sending period, and the type-1 OAM block is received in the period corresponding to the sending period immediately following the next sending period.

In an embodiment, the receiving unit 2201 is configured so that one OAM message is carried in a plurality of type-2 OAM blocks;

the type-2 OAM blocks corresponding to a current OAM message are not received until receiving of the type-2 OAM blocks corresponding to a previous OAM message is completed.

In an embodiment, the processing unit 2202 is configured to parse the received OAM block to obtain corresponding fields.

In practice, the receiving unit 2201 may be realized by a communication interface in the OAM message transmission apparatus; and the processing unit 2202 may be realized by a processor in the OAM message transmission apparatus.

It should be noted that: the OAM message transmission apparatus provided in the above-mentioned embodiments is merely illustrated exemplarily according to the division of the above-mentioned program modules when the transmission of the OAM message is performed. In practice, the above-mentioned processing can be divided and assigned to different program modules according to needs, that is, the internal structure of the apparatus may be divided into different program modules to complete all or part of the processing described above. In addition, the OAM message transmission apparatus provided in the above-mentioned embodiments and the OAM message transmission method embodiments belong to the same idea, and specific implementation process thereof is detailed in the method embodiments, and will not be repeated here.

Figure 23:
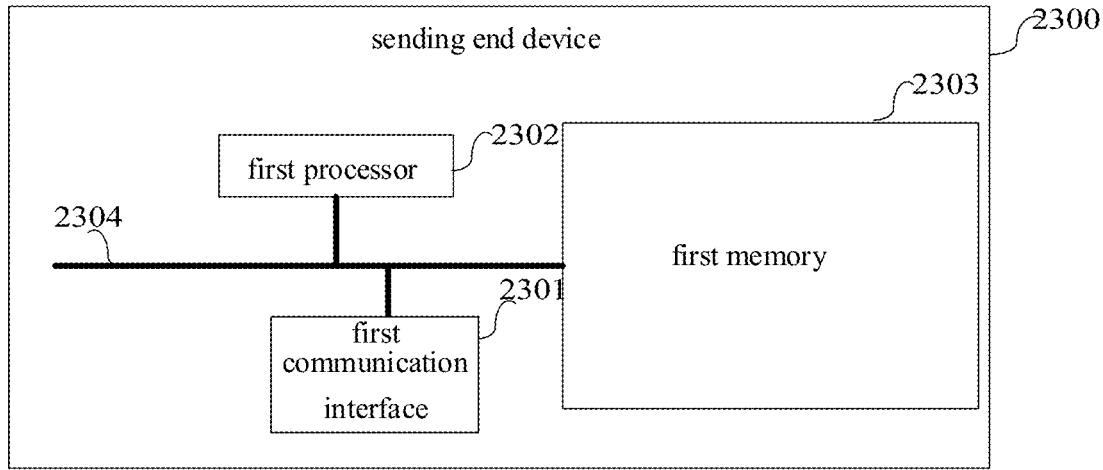
FIG. 23 is a schematic structural view of the sending end device according to an embodiment of the present disclosure.

Based on the hardware implementation of the above-mentioned program modules, and in order to implement the method on the sending end device side according to the embodiments of the present disclosure, the embodiments of the present disclosure also provide a sending end device, as shown in FIG. 23, the sending end device 2300 includes:

a first communication interface 2301, capable of performing information interaction with the receiving end device; and a first processor 2302, connected to the first communication interface 2301 to realize information interaction with the receiving end device, and configured to execute a computer program to implement the method provided by one or more above-mentioned technical solutions on the sending end device side; wherein the computer program is stored in a first memory 2303.

Specifically, the first communication interface 2301 is configured to send an OAM block carrying an OAM message, wherein only a single OAM block is sent in each sending period.

In an embodiment, the first processor 2302 is configured to generate an OAM block by using an OAM message, where the OAM block uses a block type of a TDM channel;

In an embodiment, the first communication interface 2301 is configured so that the OAM block includes a type-1 OAM block and a type-2 OAM block;

after sending of the type-1 OAM block in one period is completed, in case that there is the type-2 OAM block that needs to be sent, the type-2 OAM block is sent in a next period, and the type-1 OAM block is sent in a period immediately following the next period;

in case that there is no type-2 OAM block that needs to be sent, the OAM block is not sent in the next period, and the type-1 OAM block is sent in the period immediately following the next period.

In an embodiment, the first communication interface 2301 is configured so that one OAM message is carried in a plurality of type-2 OAM blocks;

the type-2 OAM blocks corresponding to a current OAM message are not sent until sending of the type-2 OAM blocks corresponding to a previous OAM message is completed.

It should be noted that: the specific processing processes of the first processor 2302 and the first communication interface 2301 can be understood with reference to the above-mentioned method.

Certainly, in actual application, various components in the sending end device 2300 are coupled together through a bus system 2304. It can be appreciated that the bus system 2304 is configured to implement connection communication between these components. In addition to the data bus, the bus system 2304 also includes a power bus, a control bus and a status signal bus. However, for clarity of illustration, the various buses are all labeled as the bus system 2304 in FIG. 23.

The first memory 2303 in the embodiment of the present disclosure is configured to store various types of data to support the operation of the sending end device 2300. Examples of such data include: any computer program for being run on the sending end device 2300.

The methods disclosed in the above-mentioned embodiments of the present disclosure may be applied in the first processor 2302 or implemented by the first processor 2302. The first processor 2302 may be an integrated circuit chip, which has a signal processing capability. In the implementation process, various steps of the above-mentioned method may be implemented by an integrated logic circuit of hardware or instructions in the form of software in the first processor 2302. The aforementioned first processor 2302 may be a general-purpose processor, a digital signal processor (DSP), or other programmable logic devices, discrete gate or transistor logic devices, discrete hardware components, and the like. The first processor 2302 may implement or execute various methods, steps, and logic block diagrams disclosed in the embodiments of the present disclosure. A general-purpose processor may be a microprocessor or any conventional processor or the like. The steps of the method disclosed in the embodiments of the present disclosure may be directly implemented by a hardware decoding processor, or implemented by a combination of hardware and software modules in the decoding processor. The software module may reside in a storage medium, and the storage medium resides in the first memory 2303, and the first processor 2302 reads the information in the first memory 2303, and implements the steps of the foregoing method in combination with hardware thereof.

In an exemplary embodiment, the sending end device 2300 may be implemented by one or more application specific integrated circuits (ASICs), a DSP, programmable logic device (PLD), complex programmable logic device (CPLD), field-programmable gate array (FPGA), general-purpose processor, controller, micro controller unit (MCU), microprocessor, or other electronic components, and is configured to perform the aforementioned method.

Figure 24:
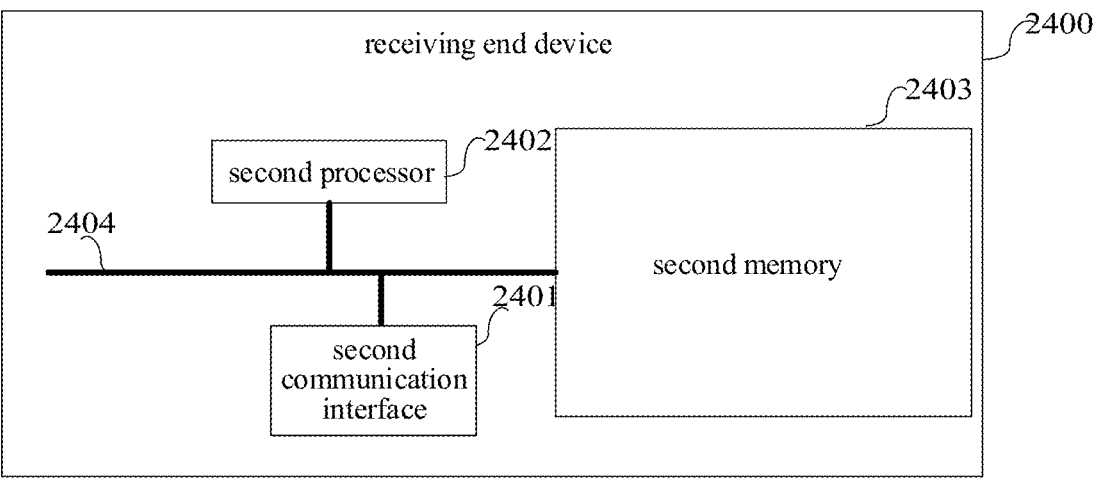
FIG. 24 is a schematic structural view of the receiving end device according to an embodiment of the present disclosure.

Based on the hardware implementation of the above-mentioned program modules, and in order to implement the method on the receiving end device side according to the embodiments of the present disclosure, the embodiments of the present disclosure also provide a receiving end device, as shown in FIG. 24, the receiving end device 2400 includes:

a second communication interface 2401, capable of performing information interaction with the sending end device; and a second processor 2402, connected to the second communication interface 2401 to realize information interaction with the sending end device, and configured to execute a computer program to implement the method provided by one or more above-mentioned technical solutions on the receiving end device side; wherein the computer program is stored in a second memory 2403.

Specifically, the second communication interface 2401 is configured to receive only a single OAM block in a period corresponding to one sending period, wherein an OAM message is carried in the single OAM block.

In an embodiment, the second processor 2402 is configured to extract the OAM message from the received OAM block.

In an embodiment, the OAM block includes a type-1 OAM block and a type-2 OAM block; the second communication interface 2401 is configured so that after completing receiving of the type-1 OAM block in a period corresponding to a sending period, in case that there is the type-2 OAM block that needs to be received, the type-2 OAM block is received in a period corresponding to a next sending period, and the type-1 OAM block is received in a period corresponding to a sending period immediately following the next sending period;

in case that there is no type-2 OAM block that needs to be received, the OAM block is not received in the period corresponding to the next sending period, and the type-1 OAM block is received in the period corresponding to the sending period immediately following the next sending period.

In an embodiment, the second communication interface 2401 is configured so that one OAM message is carried in a plurality of type-2 OAM blocks;

the type-2 OAM blocks corresponding to a current OAM message are not received until receiving of the type-2 OAM blocks corresponding to a previous OAM message is completed.

In an embodiment, the second processor 2402 is further configured to parse the received OAM block to obtain corresponding fields.

It should be noted that: the specific processing processes of the second processor 2402 and the second communication interface 2401 can be understood with reference to the above-mentioned method.

Certainly, in actual application, various components in the receiving end device 2400 are coupled together through a bus system 2404. It can be appreciated that the bus system 2404 is configured to implement connection communication between these components. In addition to the data bus, the bus system 2404 also includes a power bus, a control bus and a status signal bus. However, for clarity of illustration, the various buses are all labeled as the bus system 2404 in FIG. 24.

The second memory 2403 in the embodiment of the present disclosure is configured to store various types of data to support the operation of the receiving end device 2400. Examples of such data include: any computer program for being run on the receiving end device 2400.

The methods disclosed in the above-mentioned embodiments of the present disclosure may be applied in the second processor 2402 or implemented by the second processor 2402. The second processor 2402 may be an integrated circuit chip, which has a signal processing capability. In the implementation process, various steps of the above-mentioned method may be implemented by an integrated logic circuit of hardware or instructions in the form of software in the second processor 2402. The aforementioned second processor 2402 may be a general-purpose processor, a DSP, or other programmable logic devices, discrete gate or transistor logic devices, discrete hardware components, and the like. The second processor 2402 may implement or execute various methods, steps, and logic block diagrams disclosed in the embodiments of the present disclosure. A general-purpose processor may be a microprocessor or any conventional processor or the like. The steps of the method disclosed in the embodiments of the present disclosure may be directly implemented by a hardware decoding processor, or implemented by a combination of hardware and software modules in the decoding processor. The software module may reside in a storage medium, and the storage medium resides in the second memory 2403, and the second processor 2402 reads the information in the second memory 2403, and implements the steps of the foregoing method in combination with hardware thereof.

In an exemplary embodiment, the receiving end device 2400 may be implemented by one or more ASICs, a DSP, PLD, CPLD, FPGA, general-purpose processor, controller, MCU, microprocessor, or other electronic components, and is configured to perform the aforementioned method.

It can be understood that the memory (the first memory 2303 and the second memory 2403) in the embodiments of the present disclosure may be a volatile memory or a nonvolatile memory, and may also include both volatile and nonvolatile memories, where the non-volatile memory may be read-only memory (ROM), programmable read-only memory (PROM), erasable programmable read-only memory (EPROM), electrically erasable programmable read-only memory (EEPROM), ferromagnetic random access memory (FRAM), flash memory, magnetic surface storage, optical disc, or compact disc read-only memory (CD-ROM); magnetic surface storage may be a magnetic disk storage or a magnetic tape storage. The volatile memory may be random access memory (RAM), which is used as an external cache. By way of illustration and not limitation, many forms of RAMs are available, e.g., static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), SyncLink dynamic random access memory (SLDRAM), direct Rambus random access memory (DRRAM). The memories described in the embodiments of the present disclosure are intended to include, but are not limited to, these and any other suitable types of memories.

Figure 25:
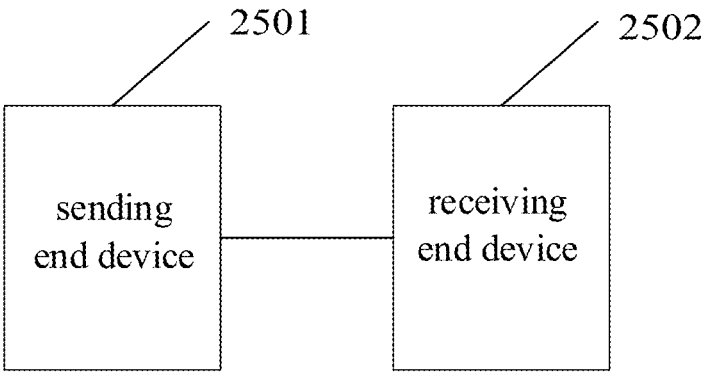
FIG. 25 is a schematic structural view of an OAM message transmission system according to an embodiment of the present disclosure.

In order to implement the methods in the embodiments of the present disclosure, the embodiments of the present disclosure further provide an OAM message transmission system, as shown in FIG. 25, the system includes: a sending end device 2501 and a receiving end device 2502.

Here, it should be noted that: the specific processing processes of the sending end device 2501 and the receiving end device 2502 have been described in detail above, and will not be repeated here.

In an exemplary embodiments, the embodiments of the present disclosure also provide a storage medium, that is, a computer storage medium, specifically a computer-readable storage medium, for example, the first memory 2303 storing a computer program, and the computer program may be executed by the first processor 2302 of the sending end device 2300 to implement the steps set forth in the above-mentioned method on the sending end device side; for another example, the second memory 2403 storing a computer program, and the above-mentioned computer program can be executed by the second processor 2402 of the receiving end device 2400 to implement the steps set forth in the above-mentioned method on the receiving end device side. The computer-readable storage medium may be FRAM, ROM, PROM, EPROM, EEPROM, flash memory, magnetic surface storage, optical disc, CD-ROM, or the like.

It should be noted that the term "first", "second", etc. are used to distinguish similar objects, and are not necessarily intended to describe a specific order or sequence.

In addition, the technical solutions described in the embodiments of the present disclosure may be combined arbitrarily if no conflict exists.

The above descriptions are only optional embodiments of the present disclosure, and are not intended to limit the scope of the present disclosure.

What is claimed is:

1. An operations, administration and maintenance (OAM) message transmission method, performed by a sending end device, comprising:

sending an OAM block carrying an OAM message, wherein only a single OAM block is sent in each sending period;

wherein the OAM block comprises a type-1 OAM block and a type-2 OAM block, wherein the type-1 OAM block and the type-2 OAM block are provided with periodic sending opportunities, respectively, and the periodic sending opportunities of the type-1 OAM block are not overlapped with the periodic sending opportunities of the type-2 OAM block;

after sending of the type-1 OAM block in one period is completed, in case that there is the type-2 OAM block that needs to be sent, the type-2 OAM block is sent at the sending opportunity of the type-2 OAM block in a next period, and the type-1 OAM block is sent at the sending opportunity of the type-1 OAM block in a period immediately following the next period;

in case that there is no type-2 OAM block that needs to be sent, no OAM block is sent at the sending opportunity of the type-2 OAM block in the next period, and the type-1 OAM block is sent at the sending opportunity of the type-1 OAM block in the period immediately following the next period.

2. The OAM message transmission method according to claim 1, wherein at least one field in the OAM block is used for indicating that the block is a block for OAM.

3. The OAM message transmission method according to claim 1, wherein a plurality of OAM messages are carried in one OAM block, and the plurality of OAM messages are of different types;

or, wherein one OAM message is carried in at least two OAM blocks.

4. The OAM message transmission method according to claim 3, wherein, in case that one OAM message is carried in at least two OAM blocks, a value of a first field in the OAM block is used for indicating whether the OAM message starts.

5. The OAM message transmission method according to claim 4, wherein in case that the value of the first field of the OAM block indicates that the OAM message starts, a second field in the OAM block is used for indicating a type of the OAM message carried in the block;

or, wherein in case that the value of the first field of the OAM block indicates other situation except that the OAM message starts, a second field used for indicating a type of the OAM message is not contained in the OAM block.

6. The OAM message transmission method according to claim 3, wherein, in case that one OAM message is carried in at least two OAM blocks, a value of a third field in the OAM block is used for indicating whether the OAM message ends.

7. The OAM message transmission method according to claim 4, wherein a third field used for indicating whether the OAM message ends is not contained in the OAM block.

8. The OAM message transmission method according to claim 1, wherein one OAM message is carried in a plurality of the type-2 OAM blocks;

the type-2 OAM blocks corresponding to a current OAM message are not sent until sending of the type-2 OAM blocks corresponding to a previous OAM message is completed;

and/or, wherein different types of OAM messages are carried in different types of OAM blocks respectively.

9. A sending end device, comprising: a first processor and a first memory configured to store a computer program executable by the first processor, wherein the first processor is configured to execute the computer program, to implement steps of the method according to claim 1.

10. An OAM message transmission method, performed by a receiving end device, comprising:

receiving only a single OAM block in a period corresponding to one sending period, wherein an OAM message is carried in the single OAM block;

wherein the OAM block comprises a type-1 OAM block and a type-2 OAM block, wherein the type-1 OAM block and the type-2 OAM block are provided with periodic sending opportunities, respectively, and the periodic sending opportunities of the type-1 OAM block are not overlapped with the periodic sending opportunities of the type-2 OAM block;

after receiving of the type-1 OAM block in the period corresponding to the one sending period is completed, in case that there is the type-2 OAM block that needs to be received, the type-2 OAM block is received at the sending opportunity of the type-2 OAM block in a period corresponding to a next sending period, and the type-1 OAM block is received at the sending opportunity of the type-1 OAM block in a period corresponding to a sending period immediately following the next sending period;

in case that there is no type-2 OAM block that needs to be received, no OAM block is received at the sending opportunity of the type-2 OAM block in the period corresponding to the next sending period, and the type-1 OAM block is received at the sending opportunity of the type-1 OAM block in the period corresponding to the sending period immediately following the next sending period.

11. The OAM message transmission method according to claim 10, wherein the OAM message is extracted from the received OAM block;

and/or, wherein at least one field in the OAM block is used for indicating that the block is a block for OAM.

12. The OAM message transmission method according to claim 10, wherein a plurality of OAM messages are carried in one OAM block, and the plurality of OAM messages are of different types;

or, wherein one OAM message is carried in at least two OAM blocks.

13. The OAM message transmission method according to claim 12, wherein, in case that one OAM message is carried in at least two OAM blocks, a value of a first field in the OAM block is used for indicating whether the OAM message starts.

14. The OAM message transmission method according to claim 13, wherein in case that the value of the first field of the OAM block indicates that the OAM message starts, a second field in the OAM block is used for indicating a type of the OAM message carried in the block;

or, wherein in case that the value of the first field of the OAM block indicates other situation except that the OAM message starts, a second field used for indicating a type of the OAM message is not contained in the OAM block.

15. The OAM message transmission method according to claim 12, wherein, in case that one OAM message is carried in at least two OAM blocks, a value of a third field in the OAM block is used for indicating whether the OAM message ends.

16. The OAM message transmission method according to claim 13, wherein a third field used for indicating whether the OAM message ends is not contained in the OAM block.

17. The OAM message transmission method according to claim 10, wherein one OAM message is carried in a plurality of the type-2 OAM blocks;

the type-2 OAM blocks corresponding to a current OAM message are not received until receiving of the type-2 OAM blocks corresponding to a previous OAM message is completed;

and/or, wherein different types of OAM messages are carried in different types of OAM blocks respectively.

18. A receiving end device, comprising: a second processor and a second memory configured to store a computer program executable by the second processor, wherein the second processor is configured to execute the computer program, to implement steps of the method according to claim 10.

* * * * *